United States Patent
Honda et al.

(10) Patent No.: US 9,623,741 B2
(45) Date of Patent: Apr. 18, 2017

(54) EXHAUST STRUCTURE FOR VEHICLE

(71) Applicants: TOYOTA BOSHOKU KABUSHIKI KAISHA, Aichi-ken (JP);
KABUSHIKI KAISHA TOYOTA JIDOSHOKKI, Aichi-ken (JP);
TOYOTA JIDOSHA KABUSHIKI KAISHA, Aichi-ken (JP)

(72) Inventors: Satoshi Honda, Nagoya (JP); Takashi Suzuki, Seto (JP); Hiromi Takase, Kariya (JP); Makoto Inoue, Toyota (JP); Fumiaki Matsuura, Toyota (JP)

(73) Assignees: TOYOTA BOSHOKU KABUSHIKI KAISHA, Aichi-Ken (JP);
KABUSHIKI KAISHA TOYOTA JIDOSHOKKI, Aichi-Ken (JP);
TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 44 days.

(21) Appl. No.: 14/654,981

(22) PCT Filed: Dec. 13, 2013

(86) PCT No.: PCT/JP2013/083494
§ 371 (c)(1),
(2) Date: Jun. 23, 2015

(87) PCT Pub. No.: WO2014/103754
PCT Pub. Date: Jul. 3, 2014

(65) Prior Publication Data
US 2015/0343891 A1  Dec. 3, 2015

(30) Foreign Application Priority Data
Dec. 27, 2012  (JP) .................................. 2012-284919

(51) Int. Cl.
*B60K 1/04* (2006.01)
*B60K 11/06* (2006.01)
(Continued)

(52) U.S. Cl.
CPC ................ *B60K 1/04* (2013.01); *B60K 11/06* (2013.01); *H01M 10/613* (2015.04);
(Continued)

(58) Field of Classification Search
CPC ...... B60K 2001/005; B60K 2001/0433; B60K 2001/0416; B60K 2001/0438; B60K 11/06
(Continued)

(56) References Cited

U.S. PATENT DOCUMENTS 5,937,664 A * 8/1999 Matsuno ............ B60H 1/00278
62/186
6,662,891 B2 * 12/2003 Misu ........................ B60K 1/04
180/65.1
(Continued)

FOREIGN PATENT DOCUMENTS

JP   2008-141945    6/2008
JP   2010-089531    4/2010
(Continued)

OTHER PUBLICATIONS

International Search Report for PCT/JP2013/083494 dated Mar. 4, 2014.

*Primary Examiner* — Jeffrey J Restifo
(74) *Attorney, Agent, or Firm* — Greenblum & Bernstein, P.L.C.

(57) ABSTRACT

An exhaust structure includes a first exhaust path and a second exhaust path. The first exhaust path includes a box outlet and at least an exhaust duct that includes a duct inlet arranged below a rear seat and configured to open toward a (Continued)

battery A. The second exhaust path is communicated with the box outlet. A deck board is disposed in a luggage room. The second exhaust path includes space defined by a front end portion of the deck board closer to a front of a vehicle and at least a portion of the backrest of the rear seat and a gap defined by a front surface of the front end portion of the deck board and a portion of a back surface of the backrest opposite the front surface. Gas used for cooling down the battery is released from the gap to the luggage room via a duct exhaust conduit, a box exhaust conduit, a first interspace exhaust conduit, and a second interspace exhaust conduit.

18 Claims, 9 Drawing Sheets

(51) Int. Cl.
    *H01M 10/625* (2014.01)
    *H01M 10/613* (2014.01)
    *H01M 10/6563* (2014.01)
    *H01M 10/6566* (2014.01)
    *B60K 1/00* (2006.01)

(52) U.S. Cl.
    CPC ..... *H01M 10/625* (2015.04); *H01M 10/6563* (2015.04); *H01M 10/6566* (2015.04); *B60K 2001/005* (2013.01); *B60K 2001/0433* (2013.01); *H01M 2220/20* (2013.01)

(58) Field of Classification Search
    USPC .............................................. 180/68.1, 68.2
    See application file for complete search history.

(56) References Cited

U.S. PATENT DOCUMENTS

| | | | | |
|---|---|---|---|---|
| 7,004,233 B2* | 2/2006 | Hasegawa | ........... | H05K 7/20909 165/122 |
| 7,419,209 B1* | 9/2008 | Mangiapane | ...... | B60H 1/00278 180/65.1 |
| 7,654,351 B2* | 2/2010 | Koike | ...................... | B60K 1/04 180/68.1 |
| 7,688,582 B2* | 3/2010 | Fukazu | ..................... | B60K 1/04 180/65.1 |
| 7,900,727 B2* | 3/2011 | Shinmura | ................. | B60K 1/04 180/68.1 |
| 7,905,307 B2* | 3/2011 | Kubota | ..................... | B60K 1/04 165/202 |
| 8,048,554 B2* | 11/2011 | Yang | ................... | B60L 11/1874 180/68.1 |
| 8,118,354 B2* | 2/2012 | Lucas | ................ | B60H 1/00278 296/208 |
| 8,186,468 B2* | 5/2012 | Parrett | ..................... | B60K 1/04 180/65.1 |
| 8,187,736 B2* | 5/2012 | Park | .................... | H01M 10/625 165/202 |
| 8,272,685 B2* | 9/2012 | Lucas | ..................... | B60N 2/206 180/68.1 |
| 8,430,194 B2* | 4/2013 | Yamatani | ........... | B60H 1/00278 180/68.1 |
| 8,556,017 B2* | 10/2013 | Kubota | .................... | B60K 1/04 180/68.1 |
| 8,717,761 B2* | 5/2014 | Aoki | ........................ | B60K 1/04 165/104.33 |
| 8,741,465 B2* | 6/2014 | Nagata | ..................... | B60K 1/04 429/120 |
| 8,757,249 B2* | 6/2014 | Bandai | .............. | B60H 1/00278 165/202 |
| 8,794,361 B2* | 8/2014 | Lim | ......................... | B60K 1/04 180/68.1 |
| 8,802,267 B2 | 8/2014 | Fujiwara et al. | | |
| 9,000,724 B2* | 4/2015 | Minami | ............ | B60H 1/00278 320/109 |
| 9,067,486 B2* | 6/2015 | Janarthanam | ....... | H01M 10/625 |
| 9,126,477 B2* | 9/2015 | Zhu | ......................... | B60K 1/04 |
| 9,160,042 B2* | 10/2015 | Fujii | ........................ | B60K 1/04 |
| 9,180,773 B2* | 11/2015 | Honda | ..................... | B60K 11/06 |
| 9,302,573 B2* | 4/2016 | Janarthanam | ...... | B60H 1/00278 |
| 2001/0030069 A1* | 10/2001 | Misu | ....................... | B60K 1/04 180/68.1 |
| 2005/0056472 A1* | 3/2005 | Smith | ............... | B60H 1/00278 180/68.1 |
| 2007/0040418 A1* | 2/2007 | Ohkuma | .................. | B60K 1/04 297/15 |
| 2008/0062622 A1* | 3/2008 | Fukazu | .................... | B60K 1/04 361/678 |
| 2008/0296075 A1* | 12/2008 | Zhu | .......................... | B60K 1/04 180/68.1 |
| 2009/0260905 A1* | 10/2009 | Shinmura | ............... | B60K 1/04 180/68.1 |
| 2010/0099019 A1* | 4/2010 | Nagata | ..................... | B60K 1/04 429/120 |
| 2010/0276220 A1* | 11/2010 | Kubota | .................... | B60K 1/04 180/68.1 |
| 2011/0011654 A1* | 1/2011 | Kubota | .................... | B60K 1/04 180/65.21 |
| 2011/0318627 A1* | 12/2011 | Fujiwara | ................. | B60K 1/04 429/120 |
| 2012/0318591 A1* | 12/2012 | Lim | ......................... | B60K 1/04 180/65.31 |
| 2013/0000864 A1* | 1/2013 | Yamatani | ................. | B60K 1/04 165/59 |
| 2013/0049688 A1* | 2/2013 | Minami | ............ | B60H 1/00278 320/109 |
| 2013/0087303 A1* | 4/2013 | Lim | ......................... | B60K 1/04 165/41 |
| 2013/0092348 A1* | 4/2013 | Bito | ...................... | H01M 10/6562 165/41 |
| 2014/0069732 A1* | 3/2014 | Marcath | ................... | B60K 1/04 180/65.1 |
| 2014/0182957 A1* | 7/2014 | Honda | ................... | B60K 11/06 180/68.1 |
| 2014/0191556 A1* | 7/2014 | Krenz | ..................... | B60N 2/56 297/452.46 |
| 2014/0262573 A1* | 9/2014 | Ito | ........................... | B60K 1/04 180/68.5 |
| 2014/0302362 A1* | 10/2014 | Takizawa | ............ | H01M 10/625 429/83 |
| 2014/0338999 A1* | 11/2014 | Fujii | ........................ | B60K 1/04 180/68.5 |
| 2015/0060169 A1* | 3/2015 | Janarthanam | ....... | H01M 10/625 180/68.2 |
| 2015/0096816 A1* | 4/2015 | Pham | ................ | B60H 1/00278 180/68.2 |
| 2015/0195960 A1* | 7/2015 | Seki | ........................ | B60L 1/003 361/690 |
| 2015/0343891 A1* | 12/2015 | Honda | ..................... | B60K 1/04 180/68.1 |

FOREIGN PATENT DOCUMENTS

| | | |
|---|---|---|
| JP | 2010-149647 | 7/2010 |
| JP | 2011-194988 | 10/2011 |

* cited by examiner

EXHAUST STRUCTURE FOR VEHICLE

TECHNICAL FIELD

The present disclosure relates to an exhaust structure for a vehicle.

BACKGROUND ART

Vehicles including on-board batteries (e.g., hybrid vehicles, electric vehicles) have been known. An example of such vehicles is disclosed in Patent Document 1. Patent Document 1 discloses a configuration for adjusting a temperature of a battery by blowing air in a vehicle compartment to the battery (a battery pack). The air blown to the battery needs to be exhausted after used for cooling down the battery. The vehicle of Patent Document 1 includes an exhaust duct in a luggage room of the vehicle. The exhaust duct extends to the outside of the vehicle for sending the air to the outside of the vehicle.

RELATED ART DOCUMENT

Patent Document

Patent Document 1: Japanese Unexamined Patent Application Publication No. 2010-149647

Problem to be Solved by the Invention

In the configuration for releasing the air from the battery to the outside of the vehicle, a length of the exhaust duct tends to be large. The larger the length of the exhaust duct, the smaller the space of the luggage room of the vehicle. This is not preferable. Therefore, another configuration is considered. In the configuration, space between components of a luggage room of a vehicle (e.g., space between a deck box and a vehicle body) is used for a portion of an exhaust path (as an exhaust duct) to reduce a length of the exhaust duct.

When the space between the components of the luggage room of the vehicle is used for a portion of the exhaust path, airtightness of the exhaust path decreases in comparison to an exhaust duct. Therefore, exhaust air may leak from an expected portion, for example, a gap between components. The leaked exhaust air may create an uncomfortable condition for an occupant of the vehicle. For example, cool air in the vehicle compartment may be pushed by the leaked exhaust air toward the occupant and the occupant may feel uncomfortable with the cool air. If the exhaust air touches a spare tire in the luggage room of the vehicle, the exhaust air may smell like the spare tire. If the exhaust air that smells like the spare tire leaks from an unexpected portion, the occupant may intake the air. This is not desirable.

Disclosure of the Present Invention

The present invention was made in view of the foregoing circumstances. An object of the present invention is to provide an exhaust structure for a vehicle configured such that air that is used for cooling down a battery is less likely to lead from unexpected portions.

Means for Solving the Problem

An exhaust structure, disclosed herein, is for a vehicle including a seat and a luggage room in which a deck board is disposed closer to a rear of the vehicle than the seat. The exhaust structure is for releasing gas used for cooling down a battery disposed under the seat to the luggage room. The exhaust structure includes a first exhaust path and a second exhaust path. The first exhaust path includes a first outlet and at least an exhaust duct disposed closer to the rear of the vehicle than the battery and including a duct inlet that opens toward the battery. The second exhaust path is communicated with the first exhaust path. The second exhaust path includes space defined by a front end portion of the deck board closer to a front of the vehicle and at least a portion of a backrest of the seat and a second outlet defined by a front surface of the front end portion and a portion of a back surface of the backrest opposite the front surface of the front end portion. The first exhaust path and the second exhaust path are configured to draw the gas used for cooling down the battery and to direct the gas to the luggage room through the second outlet.

According to the configuration, the gas used for cooling down the battery is released from the second outlet to the luggage room. The second outlet is defined by the front surface of the front end portion and the portion of the back surface of the backrest opposite the front surface of the front end portion. According to the configuration, the gas used for cooling down the battery is less likely to leak from an unexpected portion. According to the configuration, the gas released from the second outlet that is defined by the front surface of the front end portion and the portion of the back surface of the backrest opposite the front surface of the front end portion is blocked by the backrest. Therefore, the gas is less likely to flow toward the front of the vehicle and thus less likely to flow toward an occupant of the vehicle. Because the second outlet is defined by the front surface of the front end portion and the portion of the back surface of the backrest opposite the front surface of the front end portion, a distance between the battery and the second outlet is relatively small. Furthermore, another component is not required to configure the second outlet. This further simplifies the exhaust structure.

A bottom of the exhaust path may be defined by a component disposed so as to extend between the back surface of the backrest and the exhaust outlet.

With the component, the exhaust gas from the first outlet is less likely to flow below the backrest and thus the gas is properly released from the second outlet.

The component may be configured by extending a portion of a covering member that covers the back surface of the backrest.

According to the configuration in which the component is configured by extending a portion of the covering member that covers the backrest, the exhaust structure is more simplified in comparison to a configuration in which the bottom of the second exhaust path is defined by another component. Furthermore, the covering member is a decorative component. Because a portion of the covering member is used as the component to define the bottom of the second exhaust path, even if the component is viewed through the second outlet, a good appearance is maintained.

The first outlet may be arranged opposite the back surface of the backrest and opens toward the front of the vehicle.

According to the configuration, the gas that flows from the first outlet to the second outlet hits the back surface of the backrest and thus a flow of the gas decreases. Therefore, the exhaust gas is further less likely to flow over the seat and then toward occupant.

The duct inlet may be located at a first end of the exhaust duct and the duct outlet may be located at a second end of the exhaust duct. The first outlet may be located closer to the front of the vehicle than the duct outlet and off to one side of the vehicle relative to the duct outlet with respect to a width direction of the vehicle.

According to the configuration, the flow of the gas from the duct outlet toward the front of the vehicle via the first outlet is reduced in comparison to a configuration in which the duct outlet and the first outlet are arranged along the front-rear direction of the vehicle. The flow of the exhaust gas from the first outlet to toward the back surface of the backrest is further reduced.

The first outlet may be located under the deck board and closer to the rear of the vehicle than a front end of the deck board closer to the front of the vehicle.

According to the configuration, the exhaust gas from the first outlet flows under the deck board. Namely, the exhaust gas is restricted by the deck board from flowing upward.

Advantageous Effect of the Invention

According to the exhaust structure for a vehicle, the exhaust gas that is used for cooling down a battery is less likely to leak from an unexpected portion.

MODE FOR CARRYING OUT THE INVENTION

First Embodiment

Figure 1:
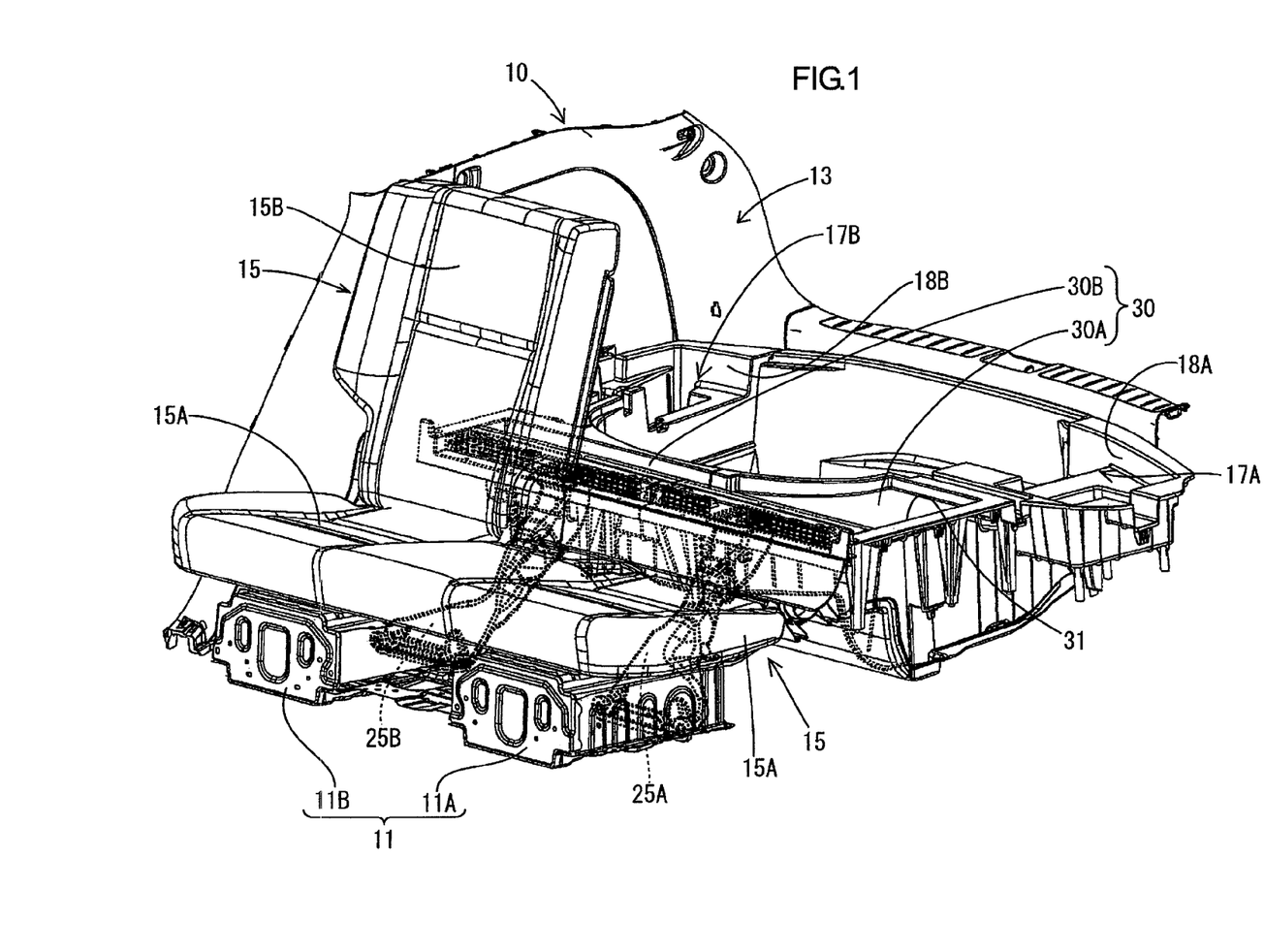
FIG. 1 is a perspective view of a rear portion of a vehicle including an exhaust structure for the vehicle according to a first embodiment.

A first embodiment will be described with reference to FIGS. 1 to 8. FIG. 1 illustrates a rear portion of a vehicle 10 including an exhaust structure for a vehicle according to this embodiment viewed from the front of the vehicle 10.

The vehicle 10 according to this embodiment is a vehicle including an on-board battery 11 (e.g., an electric vehicle, a hybrid vehicle). A front seat (not illustrated) and a rear seat 15 is installed in the vehicle 10 (see FIG. 1).

The rear seat 15 (a seat) includes a seat cushion 15A and a backrest 15B. The seat cushion 15A includes a seat surface. An occupant of the vehicle 10 sits on the seat surface. The backrest 15B supports an upper back and a lower back of the occupant who sits on the rear seat 15. The backrest 15B projects upward from the rear end of the seat surface of the seat cushion 15A.

The rear seat 15 includes a reclining mechanism (not illustrated) to adjust an angle of the backrest 15B. The vehicle 10 includes two or more of such a rear seat 15 (two in this embodiment). The rear seats 15 are arranged along the width direction of the vehicle 10.

In this embodiment, the seat cushions 15A, 15A of the respective rear seats 15 are connected to each other. Angles of the backrests 15B of the rear seats 15 are individually adjustable. The backrest of the seat on the left facing toward a travel direction of the vehicle is not illustrated in FIG. 1.

Figure 2:
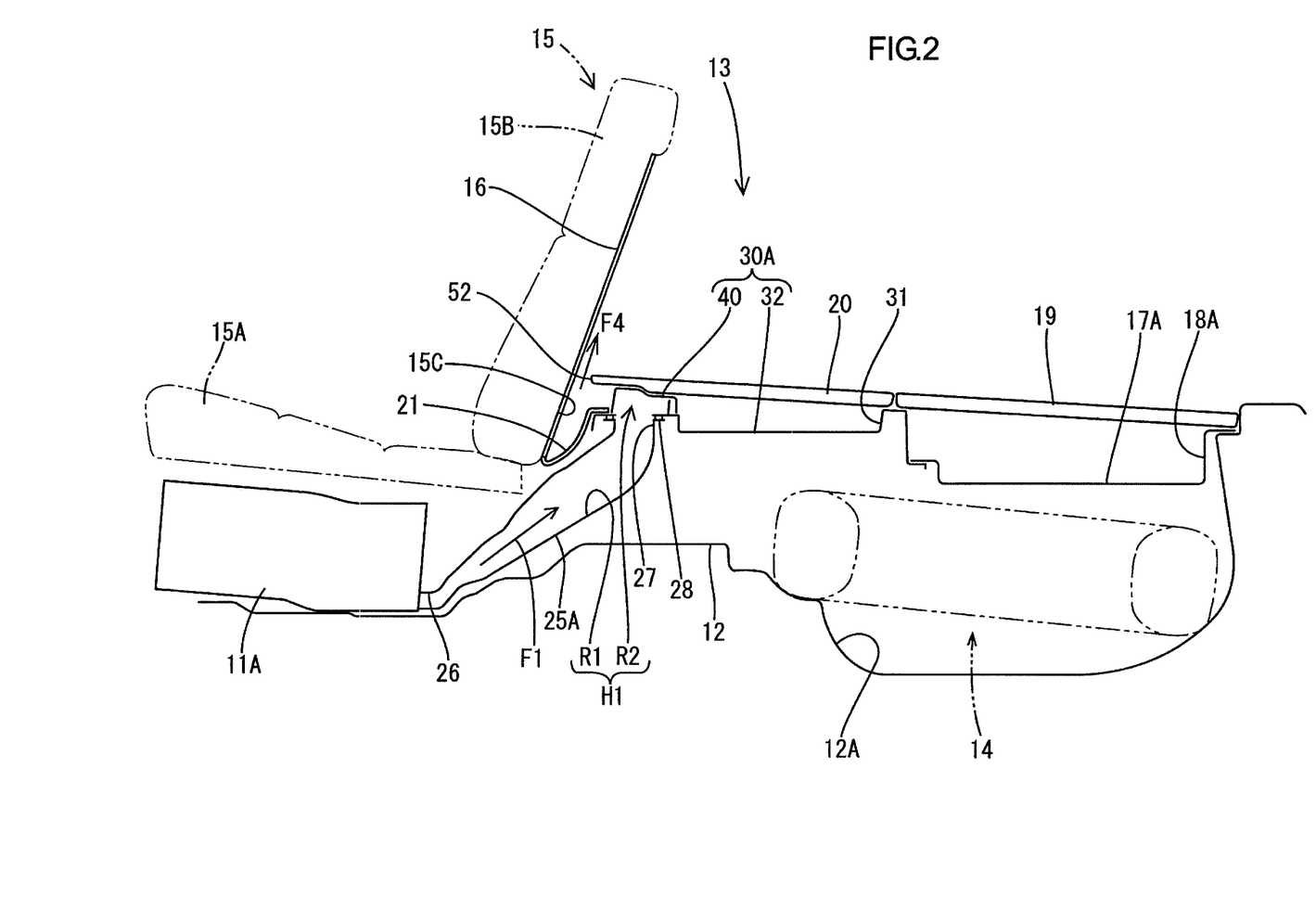
FIG. 2 is a schematic side view of interior components of the vehicle.

The battery 11 on the vehicle 10 includes two batteries. As illustrated in FIG. 2, one of two batteries is placed on a floor panel 12 under the seat cushion 15A of the rear seat 15 on the left. The other one is placed on the floor panel 12 under the seat cushion 15A of the rear seat 15 on the right. Each battery is an assembled battery including a number of electric cells (unit cells) connected to one another and covered with a metal cover.

An example of the electric cells includes a lead-acid cell, a nickel-cadmium cell, and a nickel-hydrogen cell. A configuration and a kind of the battery are not limited to those described above and can be altered as appropriate.

In the following description, the battery on the left will be referred to a left battery 11A and the battery on the right will be referred to as a right battery 11B.

Behind the rear seats 15, a luggage room 13 (a luggage room) is provided. FIG. 2 illustrates a schematic configuration of the luggage room 13. A portion of the floor panel 12 which forms a bottom wall of the luggage room 13 includes a recess 12A that opens toward the top. The recess 12A is configured to hold a spare tire 14 therein.

As illustrated in FIG. 1, deck boxes 17A, 17B and 30 (containers) for holding objects therein are disposed in the luggage room 13. The deck boxes 17A, 17B and 30 are arranged around the spare tire 14 in a plan view. As illustrated in FIG. 2, the deck box 17A is arranged above the spare tire 14. The deck box 17B is also arranged above the spare tire 14.

Specifically, the deck boxes 17A and 17B are at ends of the luggage room with respect to the width direction of the vehicle, respectively. The deck box 30 is at a front portion of the luggage room. As illustrated in FIG. 2, the deck box 30 is at about the same height as the lower end of the backrest 15B.

The deck box 30 includes a holding recess 31 that opens toward the top. The holding recess is for holding objects therein. The deck boxes 17A and 17B have holding recesses 18A and 18B that open toward the top, respectively.

As illustrated in FIG. 2, two deck boards 19, 20 are disposed in the front-rear direction of the vehicle (the horizontal direction in FIG. 2) in the luggage room 13. The deck board 19 disposed closer to the rear of the vehicle is placed over the deck boxes 17A and 17B.

The deck board 20 is disposed so as to cover the holding recess 31 of the deck box 30 from above. The deck board 20 is supported by a portion of the deck box 30 around the opening of the holding recess 31.

The vehicle 10 according to this embodiment includes an exhaust structure for releasing air used for cooling down the batteries 11A and 11B to the inside of the luggage room 13. Next, the exhaust structure will be described in detail.

The exhaust structure according to this embodiment is for releasing air used for cooling down the battery 11A (or the battery 11B) to the luggage room 13 via space between the front end of the deck board 20 and the backrest 15B. A main portion of the exhaust structure includes an exhaust duct 25A (or an exhaust duct 25B) and an exhaust conduit defined by the front end portion of the deck box 30 (an end portion closer to the front of the vehicle) and the front end portion of the deck board 20 (an end portion closer to the front of the vehicle).

Figure 3:
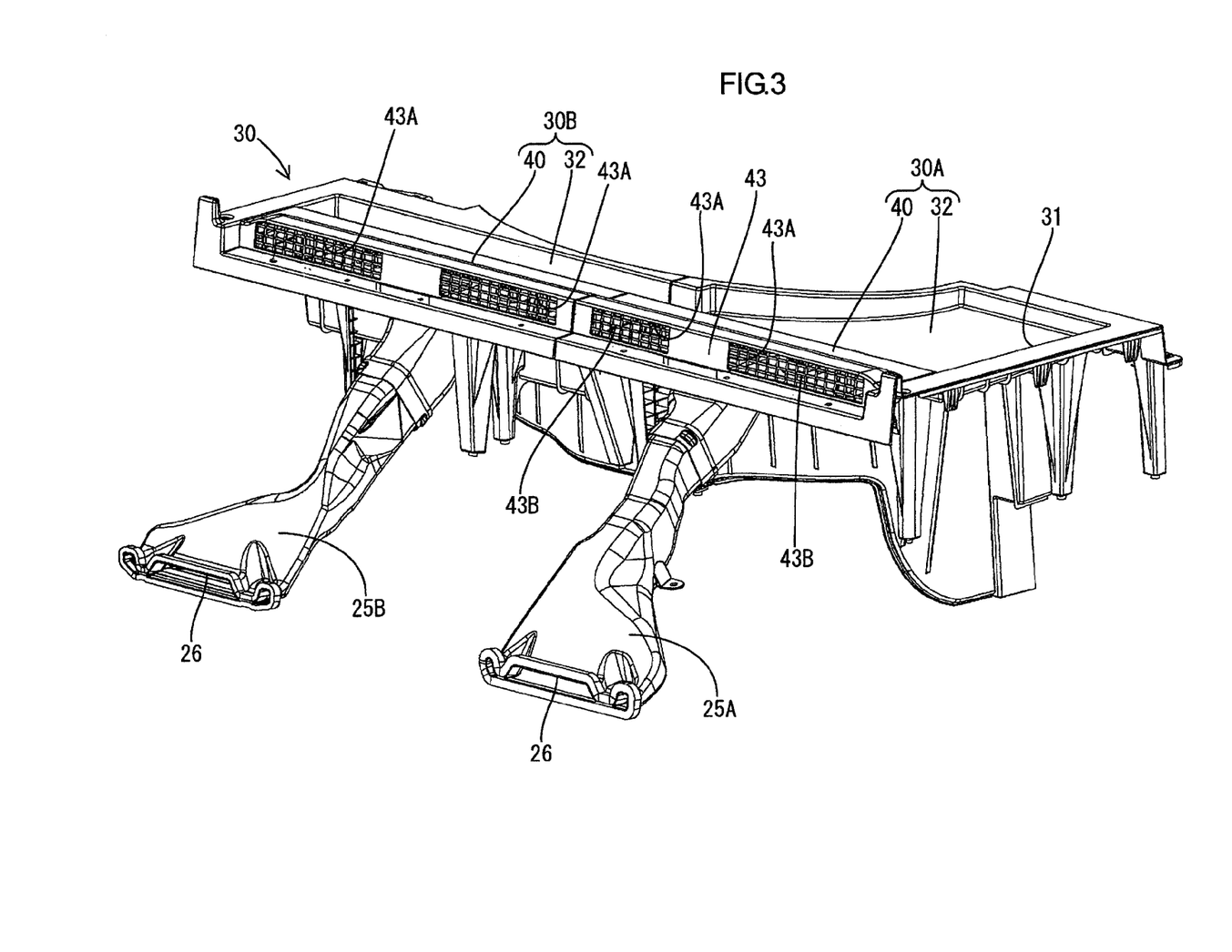
FIG. 3 is a perspective view illustrating an exhaust duct and a deck box.

As illustrated in FIG. 3, the deck box 30 includes two components arranged in the width direction of the vehicle. In the following description, the component of the deck box 30 on the left (with respect to the travel direction of the vehicle) will be referred to as a box component 30A and the component on the right (with respect to the travel direction of the vehicle) will be referred to as a box component 30B.

The main portion of the exhaust structure for releasing the air from the battery 11A includes the exhaust duct 25A and the exhaust conduit defined by the front end portion of the deck box 30 and the front end portion of the deck board 20. A main portion of the exhaust structure for releasing the air from the battery 11B includes an exhaust duct 25B and an exhaust conduit defined by the front end portion of the deck box 30 and the front end portion of the deck board 20.

The exhaust structure regarding the battery 11A and the exhaust structure regarding battery 11B are different by the exhaust ducts 25A and 15B that are symmetric. Other configurations of the exhaust structures are substantially the same. Therefore, the exhaust structure regarding the battery 11A will be mainly described.

As illustrated in FIGS. 2 and 3, the exhaust duct 25A is disposed closer to the rear of the vehicle than the battery 11A. The exhaust duct 25A includes a duct inlet 26 at one of ends. The duct inlet 26 opens toward the battery 11A.

As illustrated in FIG. 2, the exhaust duct 25A is sloped toward the upper rear of the vehicle. The exhaust duct 25A includes a duct outlet 27 at the upper end (at the other end). The duct outlet 27 opens toward the top. The duct outlet 27 has a substantially rectangular shape.

Figure 4:
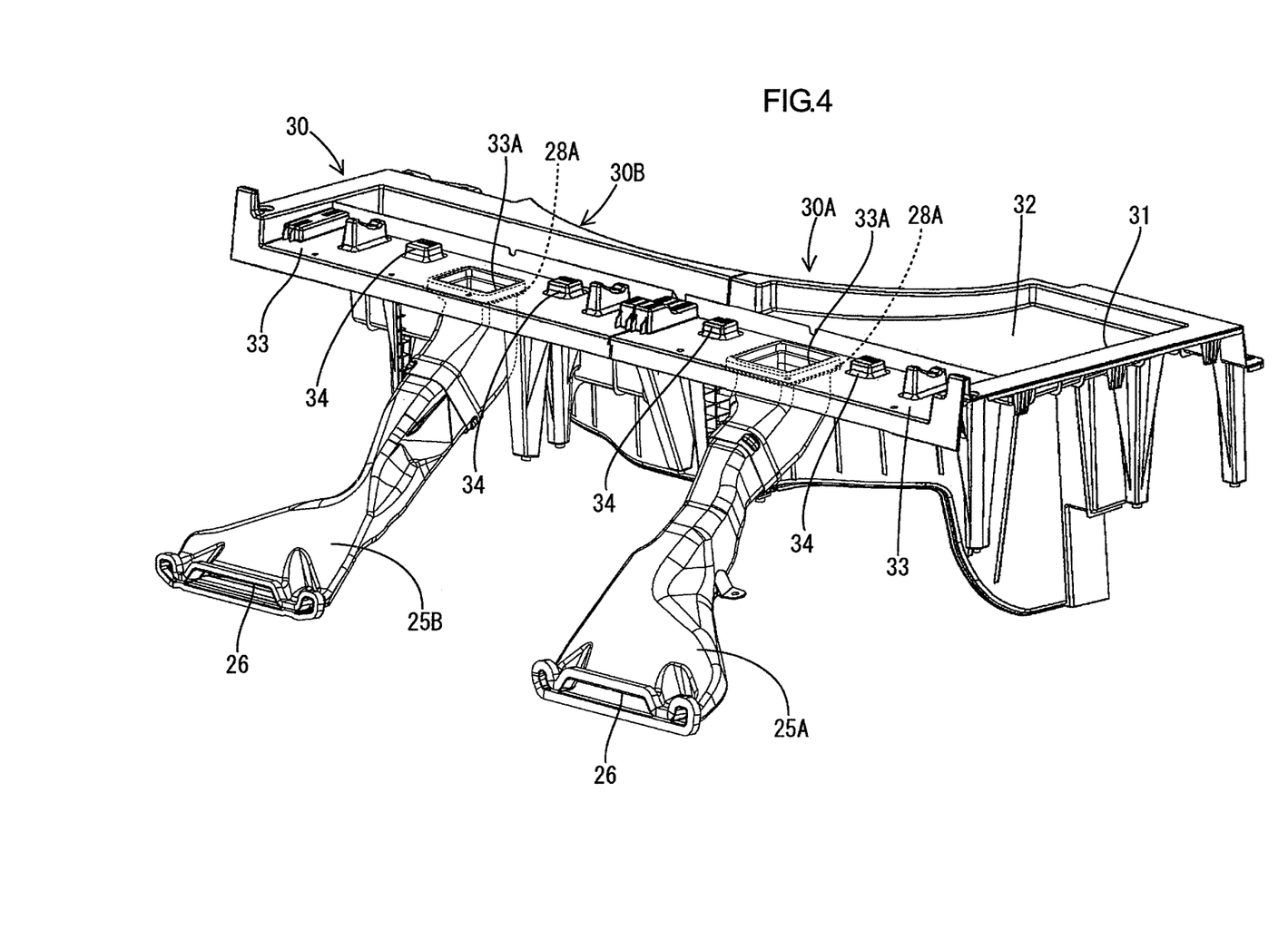
FIG. 4 is a perspective view illustrating the deck box in FIG. 3 with a deck board supporting member removed and the exhaust duct.

As illustrated in FIGS. 3 and 4, the box component 30A includes a box main portion 32 and a deck board support portion 40 connected to a front end wall 33 of the box main portion 32.

The front end wall 33 of the box main portion 32 (the front end portion of the deck box closer to the front of the vehicle) extends from an upper edge of a front wall of the holding recess 31 toward the front. The front end wall 33 has a long dimension in the width direction of the vehicle. The front end wall 33 is arranged so as to cover the duct outlet 27 from above. In a portion of the front end wall 33 corresponding to the duct outlet 27, a through hole 33A is formed. The through hole 33A has a rectangular shape and runs in the vertical direction. The front end wall 33 includes a hole edge portion 33B around the through hole 33A.

Figure 7:
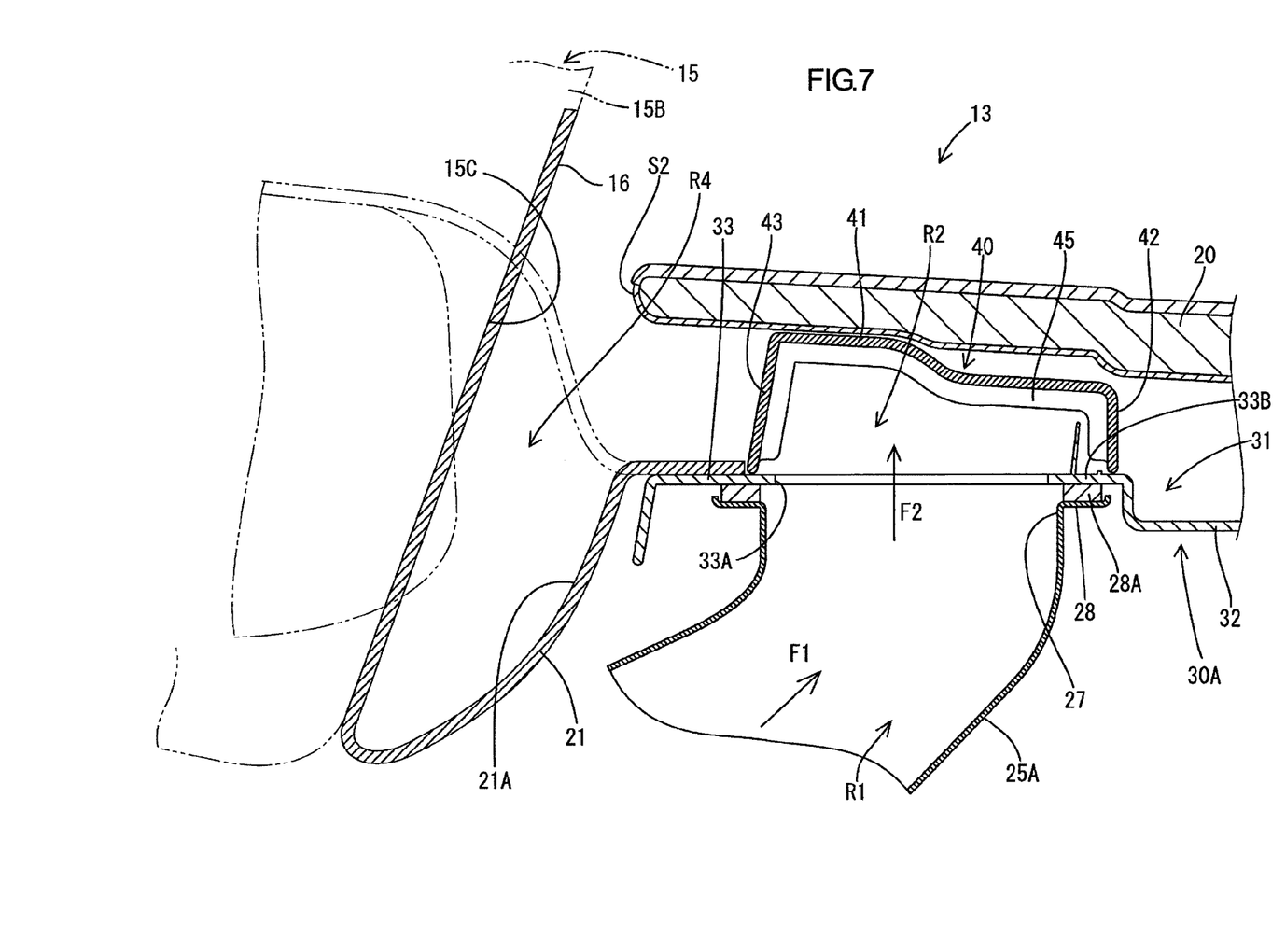
FIG. 7 is a cross-sectional view of the front end portion of the deck box in FIG. 6 along line A-A.

The exhaust duct 25A includes a flange portion 28 around the duct outlet 27 at the upper end (at the other end) thereof. As illustrated in FIGS. 4 and 7, a rectangular frame shaped sealing member is disposed on an upper surface of the flange portion 28.

The sealing member 28A disposed on the upper surface of the flange portion 28 is in contact with a lower surface of the hole edge portion 33B. Namely, the flange portion 28 is held with the hole edge portion 33B. The hole edge portion 33B is a flange holding portion that holds the flange 28.

The deck board support portion 40 is included in the front end portion of the deck box 30. As illustrated in FIGS. 3 and 7, a dimension of the deck board support portion 40 in the width direction of the vehicle is larger than a dimension thereof in the front-rear direction of the vehicle. The deck board support portion 40 opens toward the bottom. The deck board support portion 40 covers the duct outlet 27 and the through hole 33A from above. The front end wall 33 and the deck board support portion 40 define the exhaust path (a box exhaust conduit R2).

As illustrated in FIG. 7, the deck board support portion 40 includes an upper wall 41, a rear wall 42 (a sidewall), and a front wall 43. The rear wall 42 stands on the upper surface of the front end wall 33 and forms a portion of the front wall of the holding recess 31. The front wall 43 stands on opposite the rear wall 42 in a portion of the front end wall 33 close to the front edge of the through hole 33A. A rear edge of the upper wall 41 is connected to the rear wall 42 and a front edge thereof is connected to the upper edge of the front wall 43. In FIG. 7, the upper wall 41 extends from the upper edge of the rear wall 42 located closer to the rear of the vehicle toward the front of the vehicle and the front wall 43 extends from the front edge of the upper wall 41 toward the bottom of the vehicle.

The front end wall 33 (a lower wall) is arranged opposite a lower edge of the upper wall 41. The box exhaust conduit R2 is defined by the upper wall 41, the rear wall 42, the front wall 43, and the front end wall 33.

Figure 8:
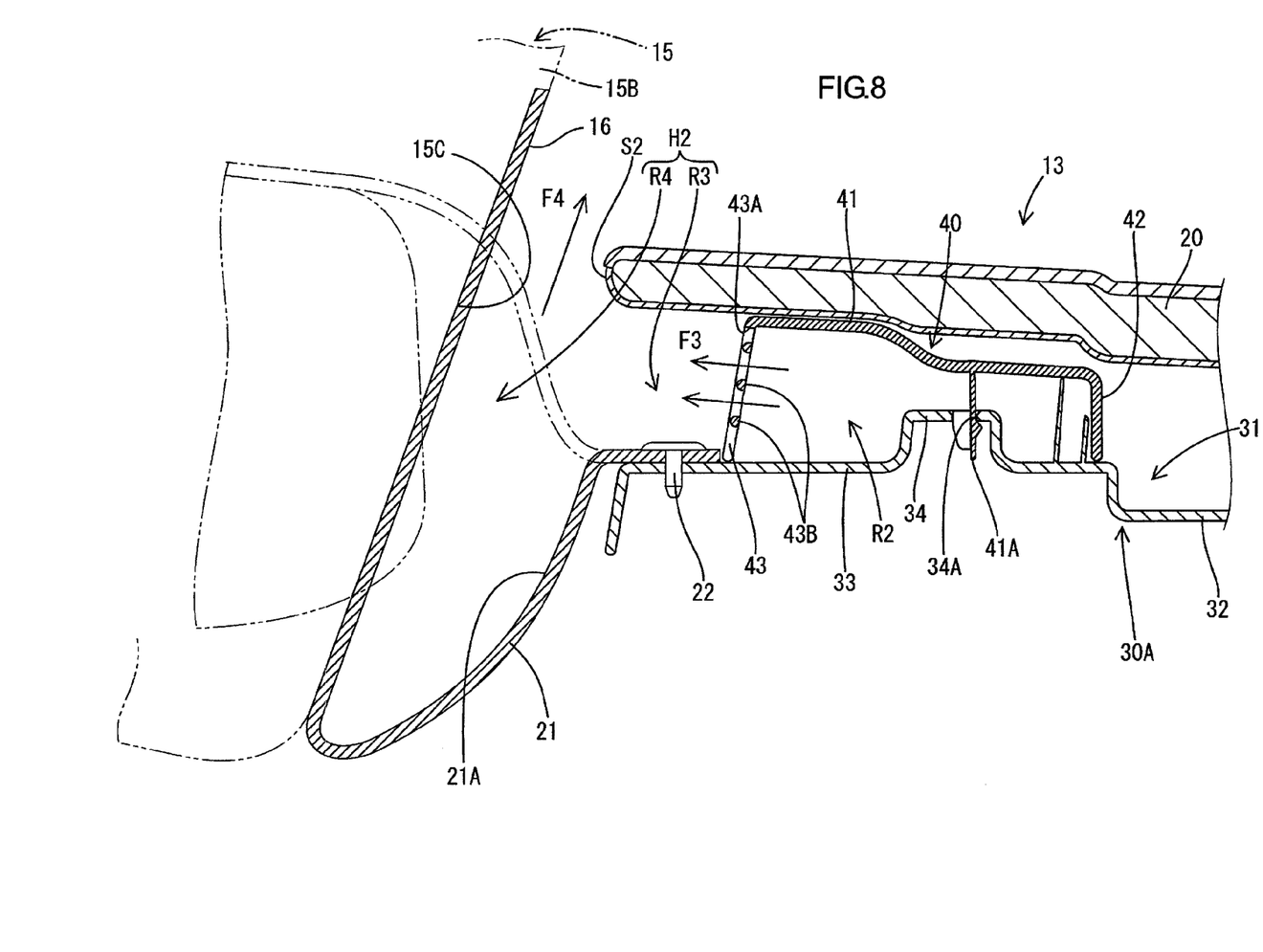
FIG. 8 is a cross-sectional view of the front end portion of the deck box in FIG. 6 along line B-B.

As illustrated in FIG. 8, a mounting lug 41A projects from the bottom surface of the upper wall 41 toward the front end wall 33. The front end wall 33 includes a protrusion 34 that protrudes upward so as to correspond to the mounting lug 41A. The protrusion 34 includes a mounting hole 34A that is a through hole formed in an upper wall of the protrusion 34. The mounting lug 41A is inserted in the mounting hole 34A. The mounting lug 41A in the mounting hole 34A is held to an edge of the mounting hole 34A from below.

A front end portion of the deck board 20 is placed on the upper surface of the upper wall 41. Namely, the upper wall 41 is a support wall configured to support the deck board 20 from below. A lower end of the rear wall 42 is disposed on the upper surface of the front end wall 33 and supported by the front end wall 33.

A lower end of the front wall 43 is disposed on the upper surface of the front end wall 33 and supported by the front end wall 33. As illustrated in FIG. 7, a rib 45 is formed on an inner surface of the deck board support portion 40. The rib 45 extends across the front wall 43, the upper wall 41, and the rear wall 42. The rib 45 increases rigidity of the deck board support portion 40.

The front wall 43 (an opposed wall) is opposed to a back surface 15C of the backrest 15B. As illustrated in FIG. 3, the front wall 43 includes a box outlet 43A (an outlet formed in the deck box) having a rectangular shape. As illustrated in FIG. 8, the box outlet 43A is located closer to the rear of the vehicle than the back surface 15C (a surface on the rear side of the vehicle compartment) of the backrest 15B and opens toward the front of the vehicle.

The box outlet 43A includes a through hole in which a grating 43B is fitted. According to the configuration, foreign substances are less likely to enter the deck board support portion 40 through the box outlet 43A.

The box exhaust conduit R2 draws air released from the exhaust duct 25A therein via the through hole 33A (an inlet of the box exhaust conduit R2) and releases the air from the box outlet 43A. According to the configuration, the air released from the duct outlet 27 of the exhaust duct 25A flows through the through hole 33A and the box exhaust conduit R2 defined by the deck board support portion 40 (the upper wall 41, the rear wall 42, and the front wall 43) and the front end wall 33, and then exits from the box outlet 43A.

Figure 5:
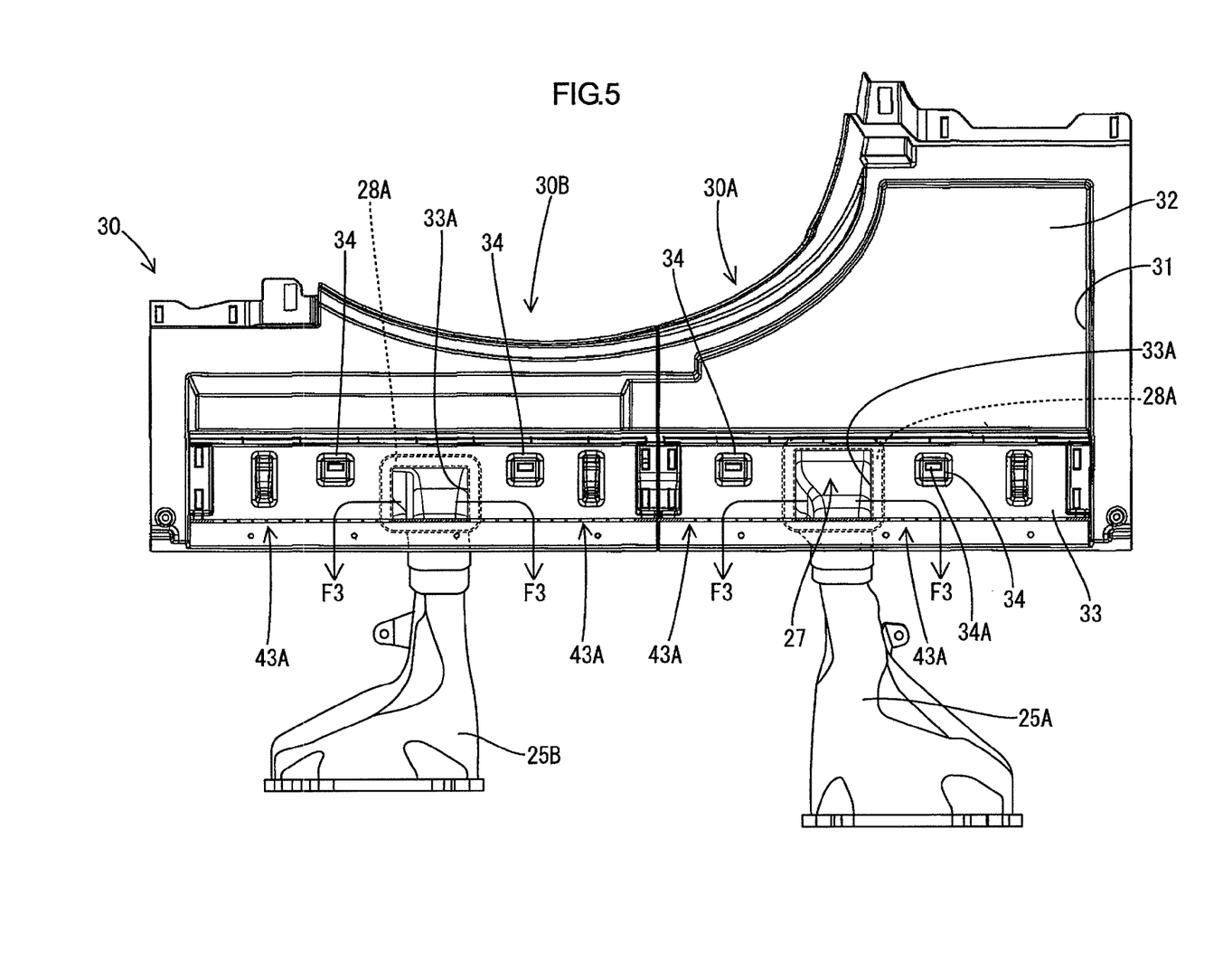
FIG. 5 is a plan view illustrating the exhaust duct and the deck box.
Figure 6:
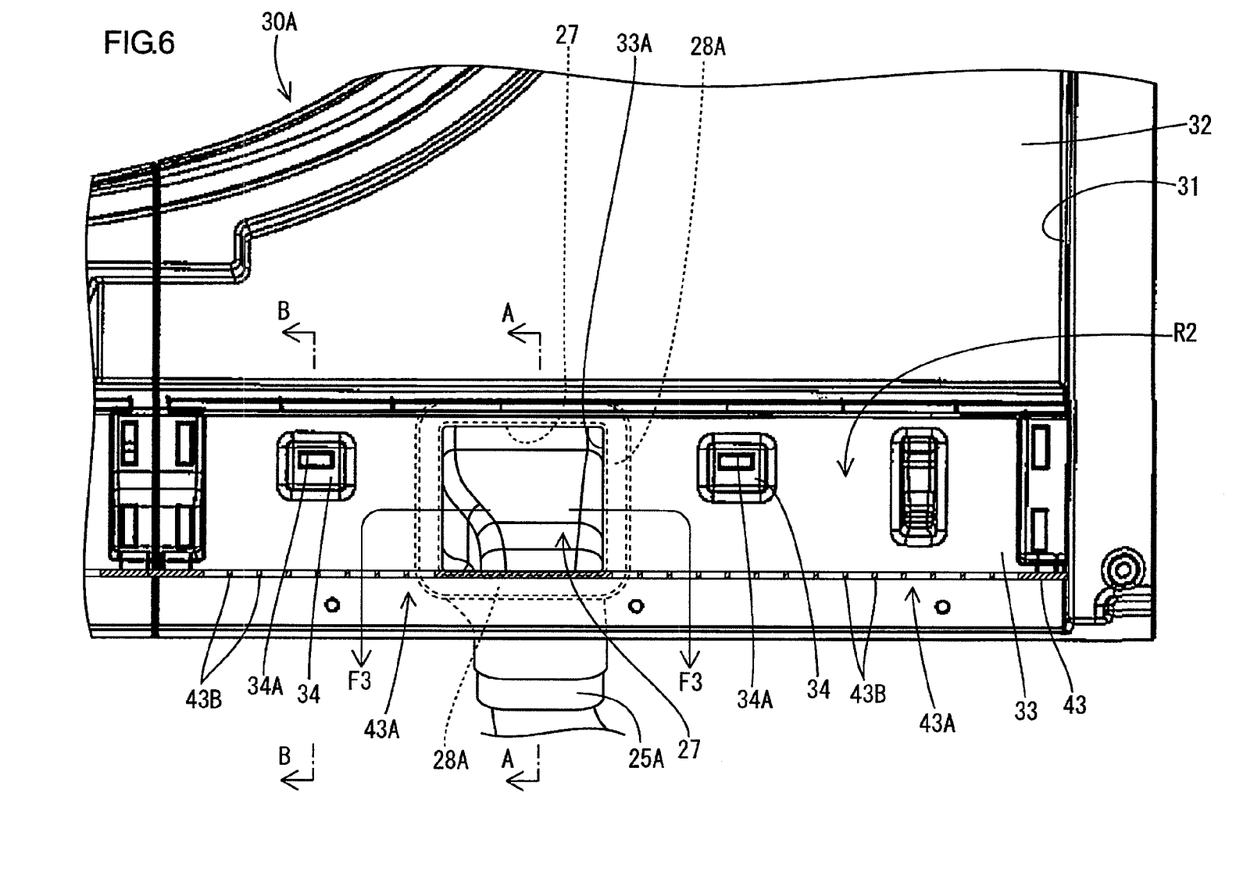
FIG. 6 is a magnified view of a front end portion of the deck box in FIG. 5, which is an end thereof closer to the front of the vehicle.

As illustrated in FIGS. 5 and 6, the box outlet 43A is located closer to the front of the vehicle (the lower side in FIG. 6) than the duct outlet 27. The front wall 43 includes two box outlets 43A.

Two box outlets 43A, 43A are arranged in the width direction of the vehicle (the horizontal direction in FIG. 6). One of two box outlets 43A, 43A is off to a side of the vehicle relative to duct outlet 27 with respect to the width direction of the vehicle. The other box outlet 43A is off to the other side of the vehicle relative to the duct outlet 27 with respect to the width direction of the vehicle.

A covering member 16 is attached to the back surface 15C of the backrest 15B opposite the box outlet 43A so as to cover the back surface 15C. Examples of material of the covering member 16 include synthetic resin, animal rawhide such as cowhide (genuine leather), woven fabric, and non-woven fabric. The material of the covering member 16 can be altered as appropriate.

The covering member 16 includes a covering member extending portion 21 that extends from the lower end of the backrest 15B (a portion that extends between the back surface of the backrest and a first outlet). As illustrated in FIG. 8, the covering member extending portion 21 extends from the lower end of the backrest 15B to a front end portion (an end portion closer to the front of the vehicle) of the front end wall 33 with slack. An end of the covering member 16 (an end of the portion that extends between the back surface of the backrest and the first outlet) is fixed to the front end portion of the front end wall 33 with fixing members such as pins 22. The covering member extending portion 21 extends so as to curve from the lower end of the backrest 15B toward the front end of the front end wall 33 that is located upper and closer to the rear of the vehicle than the lower end.

A portion of the exhaust path between the back surface 15C of the backrest 15B and the box outlet 43A includes a first interspace exhaust conduit R3 and a second interspace exhaust conduit R4. The first interspace exhaust conduit R3 is a portion defined by the front end portion of the deck board 20, the front wall 43, and the front end wall 33. The second interspace exhaust conduit R4 is a portion that continues from the front end of the first interspace exhaust conduit R3 to the back surface 15C of the backrest 15B. The covering member extending portion 21 covers the second interspace exhaust conduit R4 from below. With the covering member extending portion 21, the exhaust air and objects are less likely to enter space under the rear seat 15.

The lower end of the backrest 15B that is in a vertical position is located below the font end wall 33. The covering member extending portion 21 that is connected between the lower end of the backrest 15B and the front end wall 33 is located lower than the box outlet 43A. Space defined by the back surface 15C of the backrest 15B and the covering member extending portion 21 is referred to as lower space 21A.

In this embodiment, when a position of the backrest 15B is adjusted, a position of a base end of the covering member extending portion 21 changes. When the backrest 15B is in a forward position, the base end of the covering member extending portion 21 is at a position higher than the front end wall 33. When the backrest 15B is in the vertical position, the covering member extending portion 21 is at a position lower than the front end wall 33. Namely, during the adjustment of the position of the backrest 15B, the covering member extending portion 21 does not disturb movement of the backrest 15B. In FIGS. 7 and 8, the covering member extending portion 21 when the backrest 15B is in the forward position is indicated by two-dashed chain line.

The box outlet 43A is located under the deck board 20 and behind the front end of the deck board 20. A front surface of the front end of the deck board 20 is opposite the back surface 15C of the backrest 15B with a gap therebetween. The gap between the front surface of the front end of the deck board 20 and a portion of the back surface 15C of the backrest 15B opposite thereto is indicated by symbol S2 in FIGS. 7 and 8.

The exhaust duct 25A (a duct exhaust conduit R1) and the box exhaust conduit R2 form a first exhaust path H1 for releasing air used for cooling down the battery 11A toward the back surface 15C of the backrest 15B. The first interspace exhaust conduit R3 and the second interspace exhaust conduit R4 form a second exhaust path H2 for releasing the air released from the box outlet 43A to the inside of the luggage room 13. According to the exhaust structure, the first exhaust path H1 and the second exhaust path H2 are provided.

Next, functions of the exhaust structure for the battery 11A will be described. Air blown to the battery 11A by a blower such as a fan installed in the vehicle 10 (not illustrated) is drawn into the exhaust duct 25A through the duct inlet 26 thereof after used for cooling down the battery 11A. A flow of the air is indicated by an arrow F1 in FIG. 2.

The air flows upward through the exhaust duct 25A (the duct exhaust conduit R1). The air is drawn into the deck board support portion 40 (the box exhaust conduit R2) through the duct outlet 27 and the through hole 33A. The flow of the air is indicated by the arrow F2 in FIG. 7.

The air drawn into the deck board support portion 40 is released from two box outlets 43A toward the back surface 15C of the backrest 15B. A flow of the air is indicated by an arrow F3 in FIG. 6.

This embodiment includes the first exhaust path H1 for leasing the air used for cooling down the battery 11A toward the back surface of the backrest 15B. The first exhaust path H1 is formed form the duct exhaust conduit R1 and the box exhaust conduit R1.

The air released from the box outlet 43A (the first outlet of the first exhaust path) passes through the first interspace exhaust conduit R3 and reaches the second interspace exhaust conduit R4.

The covering member extending portion 21 is arranged below the second interspace exhaust conduit R4. Therefore, the air that reaches the second interspace exhaust conduit R4 does not flow downward, that is, flows upward. The air released from the box outlet 43A is directed to the luggage room 13 (more specifically, space behind the backrest 15B and above the deck board 20) via the gap S2 between the front end of the deck board 20 and the back surface 15C of the backrest 15B. A flow of the air is indicated by an arrow F4 in FIG. 8.

This embodiment includes the second exhaust path H2 for releasing the air released from the box outlet 43A to the luggage room 13. The second exhaust path H2 is formed from the first interspace exhaust conduit R3 and the second interspace exhaust conduit R4. The first interspace exhaust conduit R3 is defined by the deck board 20 and the front end wall 33. The second interspace exhaust conduit R4 is defined by the backrest 15B, the deck box 30, and the covering member extending portion 21.

The second exhaust path H2 is located between the box outlet 43A and the back surface 15C of the backrest 15B. One of ends of the second exhaust path H2 continues to the box outlet 43A and the other end thereof is the gap S2 (the second outlet that is an outlet of the second exhaust path).

As described above, the exhaust path including the first exhaust path H1 and the second exhaust path H2 is for directing the air used for cooling down the battery 11A to the luggage room 13 via the first exhaust path H1, the box outlet 43A, the second exhaust path H2, and the gap S2.

Next, effects of this embodiment will be described. In this embodiment, the gap S2 defined by a portion of the front surface of the front end of the deck board 20 closer to the front of the vehicle and a portion of the backrest 15B of the rear seat 15 opposite the front surface of the front end portion of the deck board 20 is configured as a second outlet. The air used for cooling down the battery 11A is released from the second outlet to the luggage room 13. According to the configuration, the air used for cooling down the battery 11A is less likely to leak from an unexpected portion.

According to the configuration for releasing the air from the second outlet, the exhaust air is blocked by the backrest 15B and thus less likely to flow toward the front of the vehicle. Therefore, the exhaust air is less likely to flow toward the occupant.

The gap S2 is configured as the second outlet. According to the configuration, a distance between the battery 11A and the second outlet (the gap S2) is relatively small. Furthermore, another component is not required to configure the second outlet. This further simplifies the exhaust structure.

A portion of the bottom of the exhaust path is defined by the covering member extending portion 21 (an extending portion) which extends to cover the bottom of the second interspace exhaust conduit R4 between the back surface 15C of the backrest 15B and the box outlet 43A.

With the covering member extending portion 21, the exhaust air from the box outlet 43A is less likely to flow toward the space below the backrest 15B. Therefore, the air is properly released from the gap S2 (the second outlet).

The covering member extending portion 21 is configured by extending a portion of the covering member 16 that covers the back surface 15C of the backrest 15B.

Because the part of the covering member 16 that covers the backrest 15B is configured as the covering member extending portion 21 (the extending portion), the configuration is more simple in comparison to a configuration in which the bottom of the second exhaust path H2 is defined by another component. Furthermore, because a portion of the covering member is configured as the extending portion, a good appearance is maintained even if the covering member extending portion 21 is viewed through the gap S2.

The box outlet 43A opens toward the bake surface 15C of the backrest 15B and the front of the vehicle.

According to the configuration, the air that flows from the box outlet 43A toward the second interspace exhaust conduit R4 (the second exhaust path) hits the back surface 15C of the backrest 15B. Therefore, the flow of the air is reduced and the exhaust air is further less likely to flow over the rear seat toward the occupant.

One of the ends of the exhaust duct 25A is the duct inlet 26 and the other end is the duct outlet 27 that opens toward the top. The box outlet 43A is arranged closer to the front of the vehicle relative to the duct outlet 27 and off toward one of the sides of the vehicle relative to the duct outlet 27 with respect to the width direction of the vehicle.

According to the configuration, the exhaust air released from the duct outlet 27 hits a portion of the front wall 43 in which the box outlet 43A is not formed. In comparison to a configuration in which the duct outlet 27 and the box outlet 43A are arranged along the front-rear direction of the vehicle, the flow of the air from the duct outlet 27 toward the front of the vehicle via the box outlet 43A is reduced.

Therefore, the flow of the air from the box outlet 43A toward the back surface 15C of the backrest 15B is further reduced.

The box outlet 43 is located under the deck board 20 and closer to the rear of the vehicle than the front end of the deck board 20.

According to the configuration, the exhaust air from the box outlet 43A flows below the deck board 20. Namely, the deck board 20 restricts the exhaust air from flowing upward.

The covering member extending portion 21 receives objects if the objects fall in the second interspace exhaust conduit R4 through the gap S2 (the gap between the front end of the deck board 20 and the back surface 15C of the backrest 15B). Namely, objects do not fall in space below the second interspace exhaust conduit R4 (and space below the backrest 15B).

The covering member extending portion 21 is arranged below the box outlet 43A.

According to the configuration, the box outlet 43A is less likely to be clogged with the objects received by the covering member extending portion 21.

The exhaust structure includes the lower space 21A defined by the back surface 15C of the backrest 15B and the covering member extending portion 21. The lower space 21A is located below the first interspace exhaust conduit.

According to the configuration, if objects fall in the recess 21A, the objects are retained in the lower space 21A.

In this embodiment, a portion of the exhaust structure for the battery 11A is defined by the deck board support portion 40 and the front end wall 33 at the front end of the deck box 30. This configuration further simplifies the exhaust structure.

The front end wall 33 of the deck box 30 is configured so as to cover the duct outlet 27 from above. According to the configuration, the duct outlet 27 is hidden by the deck box 30 and the occupant is less likely to see the duct outlet 27 from above. Namely, a good appearance is maintained.

In the above configuration, the front end portion of the deck box 30 includes the upper wall 41, the rear wall 42, and the front wall 43. The rear wall 42 stands on the upper surface of the front end wall 33 and forms a portion of the front wall of the holding recess 31. The front wall 43 stands on the portion closer to the front edge of the through hole 33A so as to be opposite the rear wall 42. The rear edge and the front edge of the upper wall 41 continue to the rear wall 42 and the upper edge of the front wall 43, respectively. The front wall 43 is arranged opposite the rear surface 15C of the backrest 15B. The upper wall 41 supports the deck board 20 from below in the luggage room 13. The box exhaust conduit R2 is defined by the rear wall 42, the upper wall 41, and the front wall 43. The box outlet 43A is the through hole formed in the font wall 43.

By defining the box exhaust conduit R2 by the upper wall 41 that is a wall configured to support the deck board 20, the exhaust structure is further simplified.

The other end of the exhaust duct 25A includes the flange 28. The front end wall 33 includes the through hole 33A that is configured as the inlet of the box exhaust conduit R2. The hole edge portion 33B around the through hole 33A is configured as the flange holding portion that holds the flange 28.

According to the configuration in which the flange 28 is held by the hole edge portion 33B around the through hole 33A that is the inlet, the exhaust duct 25A is properly fixed to the front end wall 33. Therefore, the duct exhaust conduit R1 and the box exhaust conduit R2 are properly communicated with each other.

Second Embodiment

A second embodiment will be described with reference to FIG. 9. Portions having the same configurations as those in the above embodiment will be indicated by the same symbols and will not be described. This embodiment includes a deck box 130 that includes a box component 130A. The box component 130A has a configuration different from the box component 30A in the first embodiment.

Figure 9:
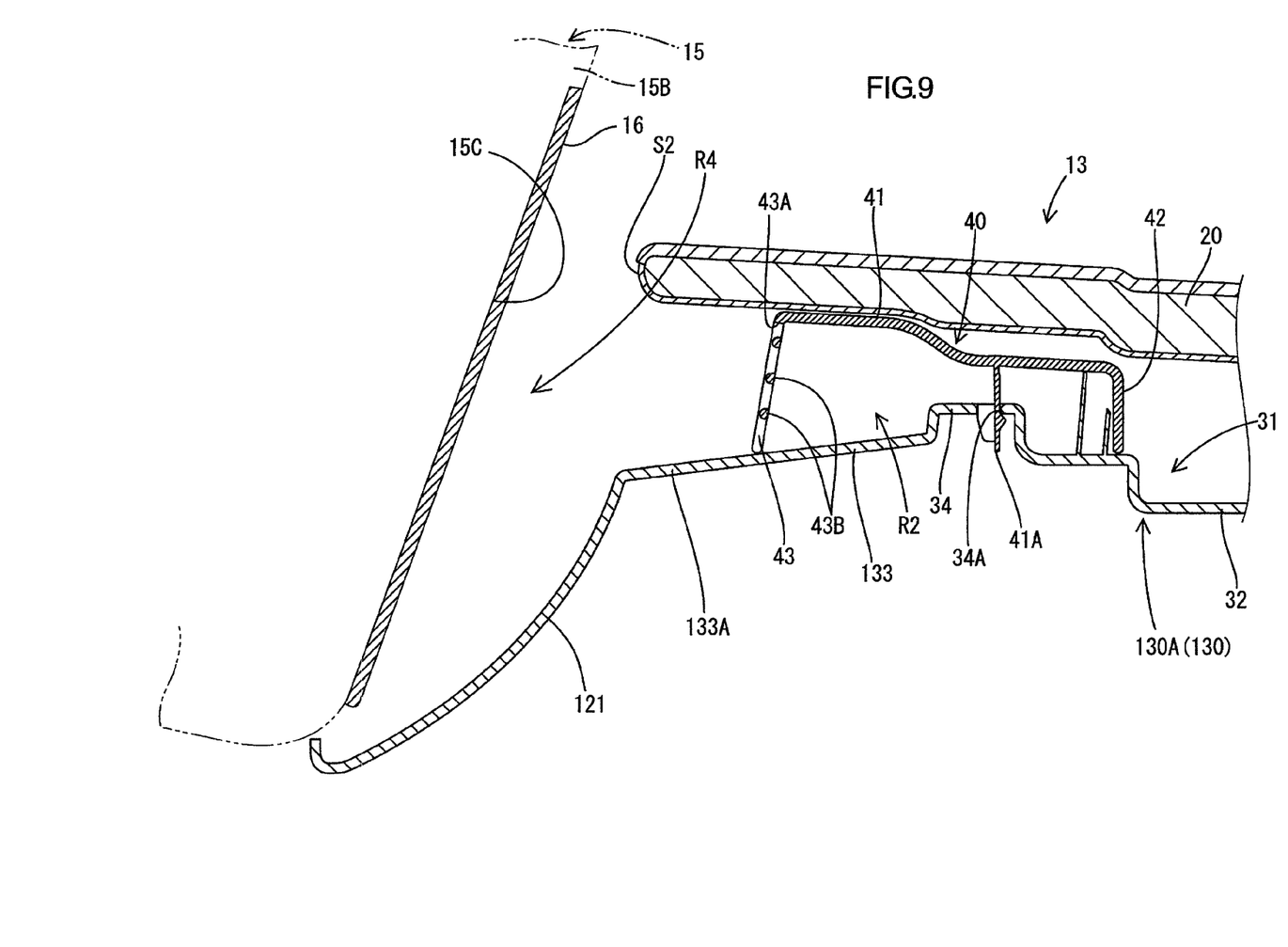
FIG. 9 is a cross-sectional view of a front end portion of a deck box, which is an end thereof closer to the front of the vehicle according to a second embodiment.

As illustrated in FIG. 9, the box component 130A includes a box main portion 132. The box main portion 132 includes a front end portion 133 that declines toward the front of the vehicle. The front end portion 133 includes a sloped portion 133A at a position closer to the front of the vehicle than the box exhaust outlet 43A. The sloped portion 133A is sloped downward.

The front end portion 133 defines a lower edge of an opening of the box outlet 43A. The front end portion 133 is sloped downward and the sloped portion 133A that is located closer to the front of the vehicle than the box outlet 43A is also sloped downward. If objects fall onto an upper surface of the sloped portion 133A, the objects are less likely to move toward the box outlet 43A (i.e., toward the rear of the vehicle).

This embodiment does not include the covering member extending portion 21 that is included in the above embodiment. Instead of the covering member extending portion 21, this embodiment includes an extending portion 121 that extends from a distal end of the sloped portion 133A (a component disposed between the back surface of the backrest and the first outlet). The extending portion 121 defines a bottom of the second interspace exhaust conduit R4 between the back surface of the backrest 15B and the box outlet 43A. According to the configuration, exhaust air and objects are less likely to fall from the second interspace exhaust conduit R4 to space below the rear seat 15.

Other Embodiments

The present invention is not limited to the embodiments described in the above description and the drawings. The following embodiments may be included in the technical scope of the present invention.

(1) The vehicle including the front seats and the rear seats is used as an example to describe the above embodiments and the rear seat is used as an example of seats for vehicles. However, the scope of the present invention is not limited to those. Examples of vehicles include one that includes only front seats (a driver's seat and a passenger seat). The front seat in such a vehicle may be used as an example of seats for vehicles.

(2) In the above embodiments, the box outlet 43A is arranged closer to the rear of the vehicle than the front end of the deck board 20. However, the scope of the present invention is not limited to the configuration. For example, the box outlet 43A and the front end of the deck board 20 may be arranged at the same position with respect to the front-rear direction of the vehicle.

(3) The front end wall 33 of the box main portion 32 in the first embodiment may be configured to extend so as to be sloped downward toward the front of the vehicle.

(4) The shape and the extending direction of the exhaust duct 25A are not limited to those in the above embodiments and may be altered as appropriate. For example, a portion of the exhaust duct 25A may extend in the width direction of the vehicle.

EXPLANATION OF SYMBOLS

10: vehicle, 11A: battery, 13: luggage room (a vehicle luggage room), 15: rear seat (a vehicle rear seat), 15B: backrest, 15C: back surface of backrest, 20: deck board, 21: covering member extending portion (an extending portion), 25A: exhaust duct, 26: duct inlet, 27: duct outlet, 43A: box outlet (a first outlet), 121: box extending portion (an extending portion), H1: first exhaust path, H2: second exhaust path, R1: duct exhaust conduit (a portion of the first exhaust path), R2: box exhaust conduit (a portion of the first exhaust path), R3: first interspace exhaust conduit (a portion of the second exhaust path), R4: second interspace exhaust conduit (space between the back surface of the backrest and the first outlet, a portion of the second exhaust path), S2: gap (a second outlet).

What is claimed is:

1. An exhaust structure for a vehicle including a seat including a backrest and a luggage room located behind the seat and in which a deck board is disposed, the exhaust structure for releasing gas used for cooling down a battery disposed under the seat to the luggage room comprising:
   an exhaust duct disposed closer to a rear of the vehicle than the battery and including a duct inlet that opens toward the battery and a duct outlet that opens toward a top of the vehicle; and
   an exhaust conduit communicated with the duct outlet, the exhaust conduit including:
   a portion defined by a front end portion of the deck board and at least a portion of the backrest of the seat; and
   an outlet defined by a front surface of the front end portion of the deck board and a portion of a back surface of the backrest opposite the front surface of the front end portion of the deck board, wherein
   the exhaust duct and the exhaust conduit are configured to draw the gas used for cooling down the battery from the duct inlet and to direct the gas to the luggage room via the exhaust conduit.

2. The exhaust structure according to claim 1, wherein the portion of the exhaust conduit includes:
   a first portion defined by the deck board and a front end wall of a deck box disposed under the deck board in the luggage room; and
   a second portion defined by the backrest, the deck box, and a component extending between the back surface of the backrest and the front end wall of the deck box.

3. The exhaust structure according to claim 2, wherein
   the component extending between the back surface of the backrest and the front end wall of the deck box is a portion of a covering member that covers the back surface of the backrest, and
   a bottom of the second portion of the exhaust conduit is defined by the portion of the covering member.

4. The exhaust structure according to claim 2, wherein
   the component extending between the back surface of the backrest and the front end wall of the deck box is an extending portion of the deck box extending from a distal end of a sloped portion of the deck box located closer to the front of the vehicle than the front end wall of the deck box, and
   a bottom of the second portion of the exhaust conduit is defined by the extending portion of the deck box.

5. The exhaust structure according to claim 2, wherein the exhaust conduit further includes a portion defined by a deck board support portion of the deck box included in a front end portion of the deck box and covering the duct outlet from above, and the portion includes a box outlet that is arranged opposite the back surface of the backrest and opens toward the front of the vehicle.

6. The exhaust structure according to claim 5, wherein the duct inlet is located at a first end of the exhaust duct closer to the battery, the duct outlet is located at a second end of the exhaust duct closer to the deck box, and the box outlet is located closer to the front of the vehicle than the duct outlet and off to one side of the vehicle relative to the duct outlet with respect to a width direction of the vehicle.

7. The exhaust structure according to claim 6, wherein the portion defined by a deck board support portion of the deck box includes another box outlet that is arranged opposite the back surface of the backrest and opens toward the front of the vehicle, and the box outlets are arranged in the width direction of the vehicle such that the other box outlet is arranged closer to the front of the vehicle than the duct outlet and off to another side of the vehicle relative to the duct outlet with respect to the width direction of the vehicle.

8. The exhaust structure according to claim 5, wherein the box outlet is located under the deck board and closer to the rear of the vehicle than a front end of the deck board.

9. The exhaust structure according to claim 5, wherein the exhaust duct includes a flange around the duct outlet, the flange is held with a hole edge portion of a front end wall of the deck box around a through hole formed in the front end wall of the deck box corresponding to the duct outlet, the portion of the exhaust conduit defined by the deck board support portion is defined by an upper wall, a rear wall, and a front wall of the deck board support portion, wherein the deck board is placed on the upper wall, the rear wall stands on the front end wall, and the front wall stands opposite the rear wall in a portion of the front end wall close to a front edge of the though hole, and the box outlet is formed in the front wall of the deck board support portion.

10. An exhaust structure for a vehicle including a seat including a seat cushion having a seat surface and a backrest that projects upward from a rear end of the seat surface, and a luggage room located behind the seat and in which a deck board is disposed, the exhaust structure for releasing gas used for cooling down a battery disposed under the seat to the luggage room comprising:

an exhaust duct disposed closer to a rear of the vehicle than the battery and including a duct inlet that opens toward the battery and a duct outlet that opens toward a top of the vehicle; and an exhaust conduit communicated with the duct outlet, the exhaust conduit including:

a portion defined by a front end portion of the deck board and at least a portion of the backrest of the seat; and an outlet defined by a front surface of the front end portion of the deck board and a portion of a back surface of the backrest opposite the front surface of the front end portion of the deck board, wherein the exhaust duct and the exhaust conduit are configured to draw the gas used for cooling down the battery from the duct inlet and to direct the gas to the luggage room via the exhaust conduit.

11. The exhaust structure according to claim 10, wherein the portion of the exhaust conduit includes:

a first portion defined by the deck board and a front end wall of a deck box disposed under the deck board in the luggage room; and a second portion defined by the backrest, the deck box, and a component extending between the back surface of the backrest and the front end wall of the deck box.

12. The exhaust structure according to claim 11, wherein the component extending between the back surface of the backrest and the front end wall of the deck box is a portion of a covering member that covers the back surface of the backrest, and a bottom of the second portion of the exhaust conduit is defined by the portion of the covering member.

13. The exhaust structure according to claim 11, wherein the component extending between the back surface of the backrest and the front end wall of the deck box is an extending portion of the deck box extending from a distal end of a sloped portion of the deck box located closer to the front of the vehicle than the front end wall of the deck box, and a bottom of the second portion of the exhaust conduit is defined by the extending portion of the deck box.

14. The exhaust structure according to claim 11, wherein the exhaust conduit further includes a portion defined by a deck board support portion of the deck box included in a front end portion of the deck box and covering the duct outlet from above, and the portion includes a box outlet that is arranged opposite the back surface of the backrest and opens toward the front of the vehicle.

15. The exhaust structure according to claim 14, wherein the duct inlet is located at a first end of the exhaust duct closer to the battery, the duct outlet is located at a second end of the exhaust duct closer to the deck box, and the box outlet is located closer to the front of the vehicle than the duct outlet and off to one side of the vehicle relative to the duct outlet with respect to a width direction of the vehicle.

16. The exhaust structure according to claim 15, wherein the portion defined by a deck board support portion of the deck box includes another box outlet that is arranged opposite the back surface of the backrest and opens toward the front of the vehicle, and the box outlets are arranged in the width direction of the vehicle such that the other box outlet is arranged closer to the front of the vehicle than the duct outlet and off to another side of the vehicle relative to the duct outlet with respect to the width direction of the vehicle.

17. The exhaust structure according to claim 14, wherein the box outlet is located under the deck board and closer to the rear of the vehicle than a front end of the deck board.

18. The exhaust structure according to claim 14, wherein the exhaust duct includes a flange around the duct outlet, the flange is held with a hole edge portion of a front end wall of the deck box around a through hole formed in the front end wall of the deck box corresponding to the duct outlet, the portion of the exhaust conduit defined by the deck board support portion is defined by an upper wall, a rear wall, and a front wall of the deck board support portion, wherein the deck board is placed on the upper wall, the rear wall stands on the front end wall, and the front wall stands opposite the rear wall in a portion of the front end wall close to a front edge of the though hole, and the box outlet is formed in the front wall of the deck board support portion.

\* \* \* \* \*